(12) United States Patent
Michalewich et al.

(10) Patent No.: US 9,808,675 B2
(45) Date of Patent: Nov. 7, 2017

(54) GOLF BALL COMPOSITIONS

(71) Applicant: Acushnet Company, Fairhaven, MA (US)

(72) Inventors: Michael Michalewich, Norton, MA (US); Brian Comeau, Berkley, MA (US); Shawn Ricci, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 58 days.

(21) Appl. No.: 14/937,985

(22) Filed: Nov. 11, 2015

(65) Prior Publication Data

US 2016/0059083 A1  Mar. 3, 2016

Related U.S. Application Data

(63) Continuation-in-part of application No. 13/613,095, filed on Sep. 13, 2012, now Pat. No. 9,227,109.

(51) Int. Cl.
| | |
|---|---|
| *A63B 37/04* | (2006.01) |
| *A63B 37/12* | (2006.01) |
| *A63B 37/00* | (2006.01) |
| *A63B 45/02* | (2006.01) |
| *C08G 18/48* | (2006.01) |
| *C08G 18/76* | (2006.01) |
| *C09D 175/08* | (2006.01) |
| *C08L 33/02* | (2006.01) |
| *C09D 175/04* | (2006.01) |
| *A63B 45/00* | (2006.01) |

(52) U.S. Cl.
CPC ...... *A63B 37/0051* (2013.01); *A63B 37/0012* (2013.01); *A63B 37/0022* (2013.01); *A63B 37/0031* (2013.01); *A63B 37/0033* (2013.01); *A63B 37/0039* (2013.01); *A63B 37/0043* (2013.01); *A63B 37/0045* (2013.01); *A63B 37/0062* (2013.01); *A63B 37/0063* (2013.01); *A63B 37/0064* (2013.01); *A63B 37/0065* (2013.01); *A63B 37/0074* (2013.01); *A63B 37/0075* (2013.01); *A63B 37/0076* (2013.01); *A63B 45/02* (2013.01); *C08G 18/4854* (2013.01); *C08G 18/7671* (2013.01); *C08L 33/02* (2013.01); *C09D 175/04* (2013.01); *C09D 175/08* (2013.01); *A63B 37/0009* (2013.01); *A63B 37/0018* (2013.01); *A63B 45/00* (2013.01); *C08L 2205/025* (2013.01)

(58) Field of Classification Search
USPC .................................................. 473/351–378
See application file for complete search history.

(56) References Cited

U.S. PATENT DOCUMENTS

| | | | |
|---|---|---|---|
| 6,395,861 B1 | 5/2002 | Kennedy, III | |
| 6,506,851 B2 | 1/2003 | Wu | |
| 6,528,578 B2 | 3/2003 | Wu | |
| 6,610,812 B1 | 8/2003 | Wu et al. | |
| 6,939,939 B2 | 9/2005 | Slagel et al. | |
| 7,148,278 B2 | 12/2006 | Bulpett et al. | |
| 7,261,535 B2 * | 8/2007 | Puniello | B29C 45/1642 425/130 |
| 7,262,235 B2 * | 8/2007 | Bulpett | A63B 37/0003 473/378 |
| 7,410,429 B1 | 8/2008 | Bulpett et al. | |
| 7,648,428 B2 | 1/2010 | Nagasawa | |
| 7,722,483 B2 * | 5/2010 | Morgan | A63B 37/12 473/378 |
| 8,529,376 B2 * | 9/2013 | Morgan | A63B 37/12 473/378 |
| 8,551,279 B2 | 10/2013 | Johnson et al. | |
| 8,758,168 B2 * | 6/2014 | Morgan | A63B 37/12 473/373 |
| 8,956,730 B2 | 2/2015 | Uprety et al. | |
| 8,979,669 B2 | 3/2015 | Greaney et al. | |
| 9,227,109 B2 * | 1/2016 | Michalewich | C08G 18/10 |
| 2008/0071016 A1 | 3/2008 | Boettcher et al. | |
| 2012/0100935 A1 | 4/2012 | Michalewich et al. | |

FOREIGN PATENT DOCUMENTS

| | | |
|---|---|---|
| DE | 3725926 | 2/1989 |
| DE | 4406024 | 8/1995 |
| EP | 31302 | 7/1981 |
| EP | 434618 | 6/1991 |
| EP | 707002 | 4/1996 |
| GB | 2319035 | 5/1998 |
| GB | 2361005 | 10/2001 |

OTHER PUBLICATIONS

U.S. Appl. No. 13/534,264, to Michaelwich, et al., filed Jun. 27, 2012.

* cited by examiner

*Primary Examiner* — Alvin Hunter
(74) *Attorney, Agent, or Firm* — Mandi B. Milbank

(57) ABSTRACT

Disclosed herein are polyurethane golf ball compositions. The compositions are prepared by adding a UV absorber to a polyol prior to reacting the polyol with an isocyanate to form a prepolymer, or by adding the UV absorber to the prepolymer, which is then reacted with a curing agent to form the polyurethane.

4 Claims, No Drawings

GOLF BALL COMPOSITIONS

CROSS-REFERENCE TO RELATED APPLICATIONS

The present application is a continuation-in-part of U.S. patent application Ser. No. 13/613,095, filed Sep. 13, 2012, the entire disclosure of which is hereby incorporated herein by reference.

FIELD OF THE INVENTION

The present invention relates generally to golf balls having a cover formed from a polyurethane composition.

BACKGROUND OF THE INVENTION

U.S. Pat. No. 6,528,578 to Wu discloses a golf ball comprising a core and a cover layer wherein the cover is formed of a polyurethane composition comprising a prepolymer comprising a saturated diisocyanate and a curing agent, and an optical brightener.

U.S. Pat. No. 6,506,851 to Wu discloses a golf ball comprising a core and a cover layer wherein the cover is formed of a polyurethane composition comprising a saturated prepolymer comprising an initiated polycaprolactone and a saturated diisocyanate, and a curing agent.

U.S. Pat. No. 7,148,278 to Bulpett discloses golf ball covers formed of a polyurethane composition including a pre-polymer, a curing agent, and a UV stabilizer package for improved color stability.

U.S. Patent Application Publication No. 2012/0100935 to Michalewich discloses a golf ball having a cover material made from a polyurethane or polyurethane/urea hybrid composition. The polyurethane or polyurethane/urea composition is produced by the reaction of an isocyanate blend having an average NCO functionality in the range of 2.05 to 2.35, a polyamine compound, and amine or hydroxyl chain-extender. The resulting cover material has many advantages including improved thermal-stability, durability, toughness, and cut/tear-resistance. The preferred isocyanates in the blend include isophorone diisocyanate ("IPDI"); 1,6-hexamethylene diisocyanate ("HDI"); 4,4'-dicyclohexylmethane diisocyanate ("$H_{12}$ MDI"); 4,4'-diphenylmethane diisocyanate (4,4'-MDI); toluene diisocyanate ("TDI"); and homopolymers and copolymers thereof.

U.S. patent application Ser. No. 13/534,264 to Michalewich, filed Jun. 27, 2012, discloses methods for making a golf ball having a cover material made from a polyurethane or polyurea composition and the resulting ball. The composition is produced using certain isocyanate blends and curatives containing freezing point depressants.

U.S. Pat. No. 6,939,939 to Slagel discloses a polyurea/urethane material and method for making it provides for improved optical parts. The material allows for ease of manufacture of parts having good optical properties, high hardness, low density, and good impact resistance. The method provides for related manufacturing advantages.

There remains a need for a polyurethane composition containing a UV absorber with reduced migration and surface bloom.

SUMMARY OF THE INVENTION

In one embodiment, the present invention is directed to a golf ball comprising a core and a polyurethane cover layer. The polyurethane cover composition comprises a reaction product of a prepolymer and a curing agent, the prepolymer is the reaction product of a polyol mixture and a diisocyanate, and the polyol mixture comprises a UV absorber in an amount such that the final polyurethane comprises from 4 wt % to 6 wt % of the UV absorber.

In another embodiment, the present invention is directed to a method of manufacturing a polyurethane golf ball cover. The method comprises combining a polyol with a UV absorber to form a polyol mixture, reacting the polyol mixture with a diisocyanate to form a prepolymer, reacting the prepolymer with a curing agent and pigment to form a polyurethane composition, and casting the polyurethane composition about a golf ball subassembly to form a polyurethane golf ball cover.

In another embodiment, the present invention is directed to a golf ball comprising an inner core layer, an outer core layer, an inner cover layer, an outer cover layer, a pigmented solvent-borne primer coat, and a solvent-borne top coat. The inner core layer is formed from a diene rubber composition and has a diameter of from 0.950 inches to 1.015 inches, a compression of 30 or less, a center Shore C hardness of from 65 to 75, a surface Shore C hardness of from 50 to 65, and a zero hardness gradient or a negative hardness gradient wherein the difference between the Shore C hardness of the outer surface of the inner core layer and the Shore C hardness of the center of the inner core layer is from −15 to −5. The outer core layer is formed from a diene rubber composition and has a thickness of from 0.250 inches to 0.300 inches and an outer surface Shore C hardness of from 85 to 95. The inner cover layer is formed from an ionomer composition and has a thickness of from 0.030 inches to 0.040 inches and an outer surface Shore C hardness of 93 or greater. The outer cover layer is formed from a polyurethane composition and has a thickness of from 0.030 inches to 0.035 inches and an outer surface Shore C hardness of from 75 to 90. The polyurethane outer cover layer composition comprises a reaction product of a prepolymer and a curing agent. The prepolymer is a reaction product of a polyol mixture and a diisocyanate, and the polyol mixture comprises a UV absorber in an amount such that the final polyurethane comprises from 4 wt % to 6 wt % of the UV absorber.

In another embodiment, the present invention is directed to a golf ball comprising a core, an inner cover layer, an outer cover layer, a pigmented solvent-borne primer coat, and a solvent-borne top coat. The core is a solid, single-layer formed from a diene rubber composition and has a diameter of from 1.510 inches to 1.530 inches, a compression of from 65 to 80, a center Shore C hardness of from 65 to 75, a surface Shore C hardness of from 65 to 75, and a zero hardness gradient or a negative or positive hardness gradient wherein the difference between the Shore C hardness of the outer surface of the inner core layer and the Shore C hardness of the center of the inner core layer is from −8 to 8. The inner cover layer is formed from an ionomer composition and has a thickness of from 0.040 inches to 0.050 inches and an outer surface Shore C hardness of 93 or greater. The outer cover layer is formed from a polyurethane composition and has a thickness of from 0.030 inches to 0.035 inches and an outer surface Shore C hardness of from 75 to 90. The polyurethane outer cover layer composition comprises a reaction product of a prepolymer and a curing agent. The prepolymer is a reaction product of a polyol mixture and a diisocyanate, and the polyol mixture comprises a UV absorber in an amount such that the final polyurethane comprises from 4 wt % to 6 wt % of the UV absorber.

In another embodiment, the present invention is directed to a golf ball comprising a core and a polyurethane cover layer. The polyurethane cover composition comprises a reaction product of a prepolymer and a curing agent, the prepolymer is the reaction product of a polyol mixture and a diisocyanate, and the polyol mixture comprises a 2-(2H-benzotriazol-2-yl)-4-(1,1,3,3-tetramethylbutyl)phenol UV absorber.

In another embodiment, the present invention is directed to a golf ball comprising an inner core layer, an outer core layer, an inner cover layer, an outer cover layer, a pigmented solvent-borne primer coat, and a solvent-borne top coat. The inner core layer is formed from a diene rubber composition and has a diameter of from 0.950 inches to 1.015 inches, an Atti compression of 30 or less, a center Shore C hardness of from 65 to 75, a surface Shore C hardness of from 50 to 65, and a zero hardness gradient or a negative hardness gradient wherein the difference between the Shore C hardness of the outer surface of the inner core layer and the Shore C hardness of the center of the inner core layer is from −15 to −5. The outer core layer is formed from a diene rubber composition and has a thickness of from 0.250 inches to 0.300 inches and an outer surface Shore C hardness of from 85 to 95. The inner cover layer is formed from an ionomer composition and has a thickness of from 0.030 inches to 0.040 inches and an outer surface Shore C hardness of 93 or greater. The outer cover layer is formed from a polyurethane composition and has a thickness of from 0.030 inches to 0.035 inches and an outer surface Shore C hardness of from 75 to 90. The polyurethane outer cover layer composition comprises a reaction product of a prepolymer and a curing agent. The prepolymer is a reaction product of a polyol mixture and a diisocyanate, and the polyol mixture comprises a 2-(2H-benzotriazol-2-yl)-4-(1,1,3,3-tetramethylbutyl)phenol UV absorber.

In another embodiment, the present invention is directed to a golf ball comprising a core, an inner cover layer, an outer cover layer, a pigmented solvent-borne primer coat, and a solvent-borne top coat. The core is a solid, single-layer formed from a diene rubber composition and has a diameter of from 1.510 inches to 1.530 inches, an Atti compression of from 65 to 80, a center Shore C hardness of from 65 to 75, a surface Shore C hardness of from 65 to 75, and a zero hardness gradient or a negative or positive hardness gradient wherein the difference between the Shore C hardness of the outer surface of the inner core layer and the Shore C hardness of the center of the inner core layer is from −8 to 8. The inner cover layer is formed from an ionomer composition and has a thickness of from 0.040 inches to 0.050 inches and an outer surface Shore C hardness of 93 or greater. The outer cover layer is formed from a polyurethane composition and has a thickness of from 0.030 inches to 0.035 inches and an outer surface Shore C hardness of from 75 to 90. The polyurethane outer cover layer composition comprises a reaction product of a prepolymer and a curing agent. The prepolymer is a reaction product of a polyol mixture and a diisocyanate, and the polyol mixture comprises a 2-(2H-benzotriazol-2-yl)-4-(1,1,3,3-tetramethylbutyl)phenol UV absorber.

In another embodiment, the present invention is directed to a method of manufacturing a polyurethane golf ball cover. The method comprises combining a polyol with 2-(2H-benzotriazol-2-yl)-4-(1,1,3,3-tetramethylbutyl)phenol to form a polyol mixture, reacting the polyol mixture with a diisocyanate to form a prepolymer, reacting the prepolymer with a curing agent and pigment to form a polyurethane composition, and casting the polyurethane composition about a golf ball subassembly to form a polyurethane golf ball cover.

In another embodiment, the present invention is directed to a method of manufacturing a polyurethane golf ball cover. The method comprises reacting a polyol with a diisocyanate to form a prepolymer, dissolving a 2-(2H-benzotriazol-2-yl)-4-(1,1,3,3-tetramethylbutyl)phenol UV absorber in the prepolymer, reacting the prepolymer with a curing agent and pigment to form a polyurethane composition, and casting the polyurethane composition about a golf ball subassembly to form a polyurethane golf ball cover.

DETAILED DESCRIPTION

The polyurethane-based golf ball cover compositions of the present invention are the reaction product of at least one polyurethane prepolymer and a curing agent, the polyurethane prepolymer being a reaction product of a polyol component and an excess of an isocyanate component.

For purposes of the present disclosure, the term polyurethane includes the reaction product of polyurethane prepolymers and a polyol or polyamine curing agent, and, thus, includes polyurethane and polyurethane-urea compositions.

When UV absorbers are added to the polyol component prior to reacting the polyol with the isocyanate component to form the prepolymer, processability of the prepolymer is improved, there is no undesirable reduction in free isocyanate in the prepolymer, and UV absorbing properties in the final polyurethane composition are maintained. Thus, in one embodiment, the present invention is directed to a method of manufacturing a polyurethane golf ball cover comprising: combining a polyol with a UV absorber to form a polyol mixture prior to reacting the polyol mixture with a diisocyanate to form a prepolymer. In another embodiment, the polyol is reacted with the isocyanate component to form the prepolymer, and the UV absorber is then added to the prepolymer. The prepolymer is then reacted with a curing agent and pigment to form a polyurethane composition, which is then cast about a golf ball subassembly to form a polyurethane golf ball cover.

Polyol

Any polyol available to one of ordinary skill in the art is suitable for use in the polyurethane prepolymer. Exemplary polyols include, but are not limited to, polyether polyols, polycaprolactone polyols, polyester polyols, polycarbonate polyols, and hydrocarbon polyols. The hydrocarbon chain of the polyol can have saturated or unsaturated bonds, or substituted or unsubstituted aromatic and cyclic groups.

Suitable polyether polyols include, but are not limited to, polytetramethylene ether glycol (PTMEG); copolymers of polytetramethylene ether glycol and 2-methyl-1,4-butane diol (PTG-L); poly(oxyethylene)glycol; poly(oxypropylene) glycol; ethylene oxide capped (polyoxypropylene)glycol; poly(oxypropylene oxyethylene)glycol; and combinations thereof.

Suitable polycaprolactone polyols include, but are not limited to, diethylene glycol initiated polycaprolactone; propylene glycol initiated polycaprolactone; 1,4-butanediol initiated polycaprolactone; 1,6-hexanediol initiated polycaprolactone; trimethylol propane initiated polycaprolactone; neopentyl glycol initiated polycaprolactone; polytetramethylene ether glycol initiated polycaprolactone; ethylene glycol initiated polycaprolactone; dipropylene glycol initiated polycaprolactone; and combinations thereof.

Suitable polyester polyols include, but are not limited to, polyethylene adipate glycol; polyethylene propylene adipate glycol; polybutylene adipate glycol; polyethylene butylene adipate glycol; polyhexamethylene adipate glycol; polyhexamethylene butylene adipate glycol; o-phthalate-1,6-hexanediol polyester polyol; polyethylene terephthalate polyester polyols; and combinations thereof.

Suitable polycarbonate polyols include, but are not limited to, poly(phthalate carbonate) glycol, poly(hexamethylene carbonate) glycol, polycarbonate polyols containing bisphenol A, and combinations thereof.

Suitable hydrocarbon polyols include, but are not limited to, hydroxy-terminated liquid isoprene rubber (LIR), hydroxy-terminated polybutadiene polyol, hydroxy-terminated polyolefin polyols, hydroxy-terminated hydrocarbon polyols, and combinations thereof.

Other polyols that may be used to form the prepolymer include, but are not limited to, glycerols; castor oil and its derivatives; Polytail™ and Polytail™ HA polyhydroxy polyolefin oligomers, commercially available from Mitsubishi Chemical; acrylic polyols; acid functionalized polyols based on a carboxylic, sulfonic, or phosphoric acid group; dimer alcohols converted from the saturated dimerized fatty acid; and combinations thereof.

By using polyols based on a hydrophobic backbone, the polyurethane composition may be more water resistant than those using polyols without a hydrophobic backbone. Non-limiting examples of polyols based on a hydrophobic backbone include hydrocarbon polyols, hydroxy-terminated polybutadiene polyols, polyethers, polycaprolactones, and polyesters.

In a particular embodiment, the polyol is PTMEG.

UV Absorber

The UV absorber is present in an amount such that the final polyurethane composition comprises from 2 or 3 or 4 or 5 wt % to 6 or 8 or 10 wt % of the UV absorber, based on the total weight of the polyurethane composition. In a particular embodiment, the UV absorber is present in the final polyurethane composition in an amount of from 4 wt % to 6 wt %.

Suitable UV absorbers include, but are not limited to, triazines, benzoxazinones, benzotriazoles, benzophenones, benzoates, formamidines, cinnamates/propenoates, aromatic propanediones, benzimidazoles, cycloaliphatic ketones, formanilides, cyanoacrylates, benzopyranones, salicylates, substituted acrylonitriles, and combinations thereof.

Preferred substituted triazines include those having the formula:

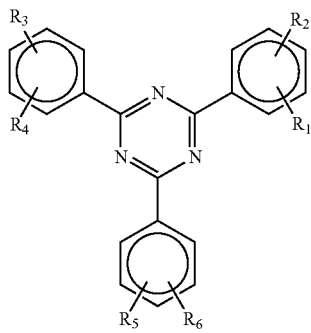

wherein $R_1$ is H, OH; $R_2$ is H, alkoxy, alkylester, hydroxyalkoxy; $R_3$ is alkyl, H; $R_4$ is alkyl, H, alkylester; $R_5$ is alkyl, H; and $R_6$ is alkyl, H, alkylester.

Preferred benzoxazinones include those including the formula:

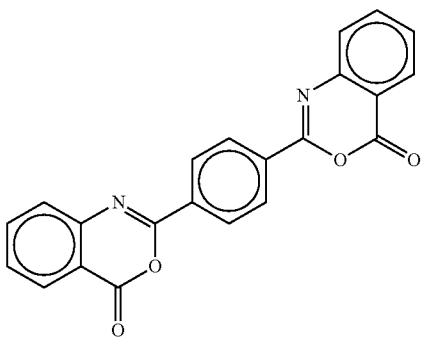

Preferred benzotriazoles include those having the formula:

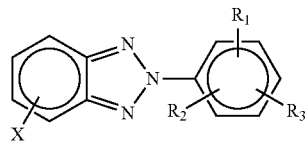

wherein $R_1$ is OH; $R_2$ is alkyl, hydroxyalkyl, acryloxyalkyl, (hydroxyphenyl)alkyl, (alkylester)alkyl, (hydroxyalkylether)oxoalkyl, phenylalkyl; $R_3$ is H, alkyl; and X is Cl, Br, I. Preferably X is Cl.

Preferred benzophenones include those having the formula:

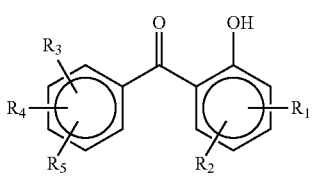

wherein $R_1$ is OH, alkoxy, alkenoic acid alkoxyester, aryloxy, hydroxyalkoxy, hydroxy(alkylether)alkoxy, (polymerized acrylo)alkoxyester, o-alkyl acid ester; $R_2$ is H, $SO_3H$, $SO_3Na$; and $R_3$ is H, OH; $R_4$ is H, alkoxy, OH; and $R_5$ is H, $SO_3Na$.

Preferred benzoates include those having the formula:

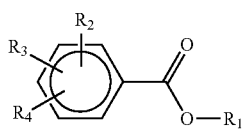

wherein $R_1$ is hydroxyalkylether, alkylphenyl, alkyl, phenyl, hydroxyphenyl; $R_2$ is H, OH, alkyl, hydroxy(alkylether) amino; $R_3$ is H, alkyl, OH; and $R_4$ is H, alkyl.

Preferred formamidines include those having the formula:

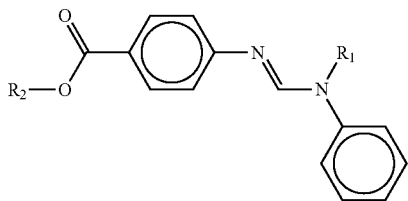

wherein $R_1$ is alkyl, $R_2$ is alkyl.

Preferred cinnamates or propenoates include those having the formula:

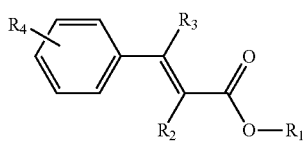

wherein $R_1$ is alkyl; $R_2$ is alkylester, cyano; $R_3$ is H, phenyl; and $R_4$ is H, alkoxy.

Preferred aromatic propanediones include those having the formula:

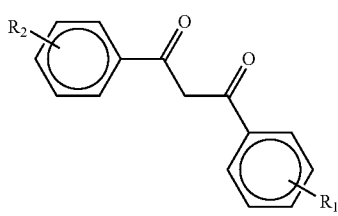

wherein $R_1$ is alkoxy; and $R_2$ is alkyl.

Preferred benzimidazoles include those having the formula:

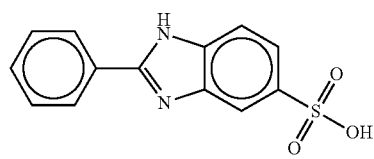

Preferred cycloaliphatic ketones include those having the formula:

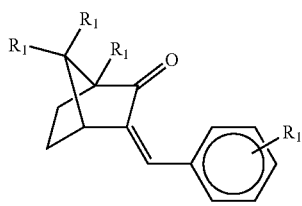

wherein $R_1$ is alkyl.

Preferred formanilides (including oxamides) include those having the formula:

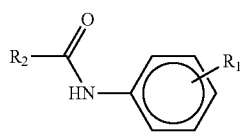

wherein $R_1$ is alkyl; $R_2$ is H, formanilide, alkylalkoxy, and/or contains benzimidazole.

Preferred cyanoacrylates include those having the formula:

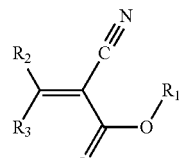

wherein $R_1$ is alkyl, arylcyanoacrylalkyl; $R_2$ is phenyl, H, alkylindoline; and $R_3$ is H, phenyl.

Preferred benzopyranones include those having the formula:

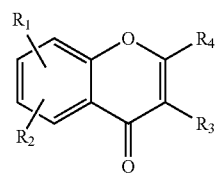

wherein $R_1$; $R_2$; $R_3$; and $R_4$ are OH.

Preferred salicylates include those having the formula:

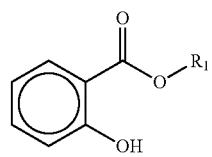

wherein $R_1$ is a linear, cyclic, or branched alkyl group.

Suitable UV absorbers also include inorganic pigments such as titanium dioxide, zinc oxide, barium sulfate, violet, Paliogen® Blue L 6385 indanthrone blue pigment, ultra marine blue, and other blue pigments; and combinations thereof.

Non-limiting examples of suitable commercially available UV absorbers are Tinuvin® and Uvinul® ultraviolet light absorbers, commercially available from BASF; Cyasorb® light stabilizers, commercially available from Cytec Industries Inc.; Hostavin® light stabilizers, commercially available from Clariant Corporation; Maxgard® UV stabilizers, commercially available from Syrgis; Seesorb UV absorbers, commercially available from Shipro Kasei Kaisha; Mark® organo based stabilizers, commercially available from Chemtura; Givsorb® UV absorbers, commercially available from Givaudan Corporation; and Neo Heliopan® UV absorbers, commercially available from Symrise AG.

Suitable UV absorbers are further disclosed, for example, in U.S. Pat. No. 5,156,405 to Kitaoh; U.S. Pat. No. 5,840, 788 to Lutz; and U.S. Pat. No. 7,722,483 to Morgan; the entire disclosures of which are hereby incorporated herein by reference.

In a particular embodiment, the UV absorber is a benzotriazole, particularly selected from:
2-(2H-benzotriazol-2-yl)-4-(1,1,3,3-tetramethylbutyl)phenol;
2-(5-chloro-2H-benzotriazole-2-yl)-6-(1,1-dimethylethyl)-4-methylphenol;
2-(2H-benzotriazol-2-yl)-6-dodecyl-4-methylphenol;
2-(2H-benzotriazol-2-yl)-4,6-bis(1-methyl-1-phenylethyl)phenol;
2-(5-chloro-2H-benzotriazole-2-yl)-6-(1,1-dimethylethyl)-4-methylphenol;
2-(2H-benzotriazol-2-yl)-4,6-ditertpentylphenol; and
2-(2H-benzotriazol-2-yl)-6-(1-methyl-1-phenylethyl)-4-(1,1,3,3-tetramethylbutyl)-phenol.

In another particular embodiment, the UV absorber is 2-(2H-benzotriazol-2-yl)-4-(1,1,3,3-tetramethylbutyl)phenol.

Particularly suitable commercially available UV absorbers include, but are not limited to, Tinuvin® 329 2-(2H-benzotriazol-2-yl)-4-(1,1,3,3-tetramethylbutyl)phenol, Tinuvin® 326 2-(5-chloro-2H-benzotriazole-2-yl)-6-(1,1-dimethylethyl)-4-methylphenol, Tinuvin® 571 2-(2H-benzotriazol-2-yl)-6-dodecyl-4-methylphenol, Uvinil® P25 4-bis(polyethoxy)paraaminobenzoic acid polyethoxyethyl ester, Tinuvin® 213 reaction product of methyl 3-(3-(2H-benzotriazole-2-yl)-5-t-butyl-4-hydroxyphenyl) propionate/PEG 300, Uvinil® 3039 (2-ethylhexyl)-2-cyano-3,3-diphenylacrylate, Uvinil® 3030 1,3-bis-[(2'-cyano-3',3'-diphenylacryloyl)oxy]-2,2-bis-{[(2'-cyano-3',3'-diphenylacryloyl)oxy]methyl}-propane, Uvinil® 3035 ethyl-2-cyano-3,3-diphenylacrylate, Uvinil® 3049 2,2-Dihydroxy-4,4-dimethoxybenzophenone, Tinuvin® P 2-(2H-benzotriazol-2-yl)-p-cresol, Chimassorb® 81 benzophenone UV absorber, Tinuvin® 460 a hydroxyphenyl-triazine UV absorber, Tinuvin® Carboprotect® a red-shifted benzotriazole-based UV absorber, Tinuvin® 328 2-(2H-benzotriazol-2-yl)-4,6-ditertpentylphenol, and Tinuvin® 928 (2-(2H-benzotriazol-2-yl)-6-(1-methyl-1-phenylethyl)-4-(1,1,3,3-tetramethylbutyl)-phenol, commercially available from BASF; Irgafos® 168 tris(2,4-ditert-butylphenyl)phosphite UV absorber, commercially available from Ciba®; Uvasorb® S34 2-(2H-Benzotriazol-2-yl)-4,6-bis(1-methyl-1-phenylethyl)phenol and Uvasorb® S26 2-(5-chloro-2H-benzotriazole-2-yl)-6-(1,1-dimethylethyl)-4-methylphenol, commercially available from 3V Inc.; UV-Check® AM-300 2-hydroxy-4-(octyloxy)benzophenone and UV-Check® AM-340 2,4 di-tert-butylphenyl 3,5-di-tert-butyl-4-hyroxybenzoate, commercially available from Ferro Corporation; and Songlight® 2920 LQ bis(1,2,2,6,6-pentamethyl-4-piperidyl) sebacate, commercially available from Songwon Chemical.

Isocyanate

The polyol, optionally combined with the UV absorber, is reacted with an isocyanate component to form the prepolymer. Suitable isocyanates include aliphatic, cycloaliphatic, aromatic aliphatic, derivatives thereof, and combinations thereof having two or more isocyanate (NCO) groups per molecule. The isocyanates may be organic, modified organic, organic polyisocyanate-terminated prepolymers, or a combination thereof. The isocyanate-containing reactable component may also include any isocyanate-functional monomer, dimer, trimer, or multimeric adduct thereof, prepolymer, quasi-prepolymer, or combination thereof. Isocyanate-functional compounds may include monoisocyanates or polyisocyanates that include any isocyanate functionality of two or more.

Suitable isocyanate-containing components include diisocyanates having the general formula NCO—R—NCO, where R is preferably a cyclic or linear or branched hydrocarbon moiety containing from 1 to 20 carbon atoms. When multiple cyclic groups are present, linear and/or branched hydrocarbons containing from 1 to 10 carbon atoms can be present as spacers between the cyclic groups. In some cases, the cyclic group(s) may be substituted at the 2-, 3-, and/or 4-positions, respectively. Substituted groups may include, but are not limited to, halogens, primary, secondary, or tertiary hydrocarbon groups, or combinations thereof.

Non-limiting examples of particularly suitable unsaturated isocyanates, i.e., aromatic compounds, include 2,2'-, 2,4'-, and 4,4'-diphenylmethane diisocyanate (MDI); 3,3'-dimethyl-4,4'-biphenyl diisocyanate (TODI); toluene diisocyanate (TDI); polymeric MDI; carbodimide-modified liquid 4,4'-diphenylmethane diisocyanate; para-phenylene diisocyanate (PPDI); meta-phenylene diisocyanate (MPDI); triphenylmethane-4,4'-, and triphenylmethane-4,4"-triisocyanate; napthylene-1,5,-diisocyanate; 2,4'-, 4,4'-, and 2,2'-biphenyl diisocyanate; polyphenylene polymethylene polyisocyanate (PMDI) (also known as polymeric PMDI); and combinations thereof.

Non-limiting examples of particularly suitable saturated isocyanates include ethylene diisocyanate; propylene-1,2-diisocyanate; tetramethylene diisocyanate; tetramethylene-1,4-diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; cyclobutane-1,3-diisocyanate; cyclohexane-1,2-diisocyanate; cyclohexane-1,3-diisocyanate; cyclohexane-1,4-diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl)dicyclohexane; isophorone diisocyanate (IPDI); triisocyanate of HDI; triisocyanate of 2,2,4-trimethyl-1,6-hexane diisocyanate (TMDI); 4,4'-dicyclohexylmethane diisocyanate (H$_{12}$MDI); 2,4-hexahydrotoluene diisocyanate; 2,6-hexahydrotoluene diisocyanate; aromatic aliphatic isocyanate, such as 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, isocyanurate of isophorone diisocyanate, and mixtures thereof; dimerized uretdione of any polyisocyanate, such as uretdione of toluene diisocyanate, uretdione of hexamethylene diisocyanate, and combinations thereof; modified polyisocyanate derived from the above isocyanates and polyisocyanates; and combinations thereof.

In a particular embodiment, the isocyanate is MDI.

Curing Agent

The polyurethane prepolymer is reacted with a curing agent. The curing agent may consist of a single curing agent or comprise a combination of two or more curing agents, and optionally includes a freezing point depressing agent. Suitable curing agents include, but are not limited to, hydroxy-terminated curing agents, amine-terminated curing agents, and combinations thereof. The curing agent may be saturated or unsaturated.

Non-limiting examples of suitable curatives include 1,4-butanediol; 1,3-butanediol; 1,2-butanediol; 2,3-butanediol; 2,3-dimethyl-2,3-butanediol; propylene glycol, dipropylene glycol; polypropylene glycol; 2-methyl-1,3-propanediol; 2-methyl-1,4-butanediol; ethylene glycol; diethylene glycol; polyethylene glycol; resorcinol-di(beta-hydroxyethyl)ether and its derivatives; hydroquinone-di(beta-hydroxyethyl) ether and derivatives thereof; 2-propanol-1,1'-phenylamino-bis; trimethylolpropane; 4,4'-methylenebis(2-chloroaniline); 3,5-dimethylthio-2,4-toluenediamine; 3,5-dimethylthio-2,6-toluenediamine; 4,4'-methylenebis(2-ethylaniline); 4,4'-bis-(sec-butylamino)-diphenylmethane; 1,3-bis-(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; 1,4-bis-(sec-butylamino)benzene; 1,2-bis-(sec-butylamino)benzene; 3,5-diethyltoluene-2,4-diamine; 3,5-diethyltoluene-2,6-diamine; tetra-(2-hydroxypropyl)-ethylenediamine; N,N'-dialkyldiamino diphenyl methane; trimethyleneglycol-di-p-aminobenzoate; polytetramethyleneoxide-di-p-aminobenzoate; 4,4'-methylene bis-(3-chloro-2,6-diethylaniline); 1,4-cyclohexyldimethylol; 2-methylpentamethylene diamine; isomers and mixtures of diaminocyclohexane; isomers and mixtures of cyclohexane bis(methylamine); polytetramethylene ether glycol; isomers and mixtures of cyclohexyldimethylol; triisopropanolamine; diethylene triamine; triethylene tetramine; tetraethylene pentamine; propylene diamine; dipropylene triamine; 1,3-diaminopropane; dimethylamino propylamine; diethylamino propylamine; diethylene glycol bis-(aminopropyl) ether; imido-bis-(propylamine); monoethanolamine; diethanolamine; triethanolamine; monoisopropanolamine; diisopropanolamine; isophoronediamine; N,N'-diisopropyl-isophoronediamine; polyoxypropylene diamine; propylene oxide-based triamine; 3,3'-dimethyl-4,4'-diaminocyclohexylmethane; 1,5-pentanediol; 1,6-hexanediol; glycerol; 1,3-bis-(2-hydroxyethoxy)cyclohexane; 1,3-bis-[2-(2-hydroxyethoxy)ethoxy]cyclohexane; 1,3-bis-{2-[2-(2-hydroxyethoxy)ethoxy]ethoxy}cyclohexane; N,N,N',N'-tetra-(2-hydroxypropyl-ethylene)diamine; ethylene diamine; hexamethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane and derivatives thereof; 1,4-bis-(sec-butylamino)-cyclohexane; 1,2-bis-(sec-butylamino)-cyclohexane; 4,4'-dicyclohexylmethane diamine; and combinations thereof.

In a particular embodiment, the curing agent is a dimethylthiotoluenediamine, e.g., Ethacure® 300 curative comprising dimethylthiotoluenediamine with a minor amount of monomethylthiotoluenediamine, commercially available from Albemarle Corporation.

The curing agent optionally comprises a freezing point depressing agent so that the freezing point of the blend is less than its normal freezing point temperature. The freezing point depressing agent is preferably compatible with the curing agent. For example, hydroxy-terminated curing agents, such as 1,4-butanediol, may be modified with a hydroxy-terminated freezing point depressing agent or a mixture of hydroxy-terminated freezing point depression agents. Examples of hydroxy-terminated freezing point depressing agents include, but are not limited to, 1,3-propanediol, 2-methyl-1,3-propanediol, 2-methyl-1,4-butanediol, 1,2-butanediol, 1,3-butanediol, ethylene glycol, diethylene glycol, 1,5-pentanediol, polytetramethylene glycol, propylene glycol, dipropylene glycol, and combinations thereof. Similarly, amine-terminated curing agents, such as hexamethylene diamine, may be modified with an amine-terminated freezing point depressing agent or a mixture of amine-terminated freezing point depressing agents. Examples of amine-terminated freezing point depressing agents include, but are not limited to, ethylene diamine, 1,3-diaminopropane, dimethylamino propylamine, tetraethylene pentamine, 1,2-propylenediamine, diethylaminopropylamine, 2,2,4-trimethyl-1,6-hexanediamine, 2,4,4-trimethyl-1,6-hexanediamine, and combinations thereof. The freezing point depressing agent is preferably added in an amount sufficient to reduce the freezing point of the curing agent by a suitable amount to prevent loss of pigment dispersion, but not affect the physical properties of the golf ball. Freezing point depressing agents are further disclosed, for example, in U.S. Pat. No. 7,888,449 to Wu, the entire disclosure of which is hereby incorporated herein by reference.

Suitable isocyanates, polyols, and curing agents are further disclosed, for example, in U.S. Patent Application Publication No. 2012/0015758 to Michalewich; U.S. Patent Application Publication No. 2012/0100935 to Michalewich; U.S. Pat. No. 6,528,578 to Wu; U.S. Pat. No. 6,506,851 to Wu; U.S. Pat. No. 7,148,278 to Bulpett; and U.S. patent application Ser. No. 13/534,264 to Michalewich; the entire disclosures of which are hereby incorporated herein by reference.

Catalyst

A catalyst is optionally employed to promote the reaction between the polyol and the isocyanate and/or between the prepolymer and the curing agent. Suitable catalysts include, but are not limited to bismuth catalysts; zinc octoate; stannous octoate; tin catalysts, e.g., bis-butyltin dilaurate, bis-butyltin diacetate, stannous octoate, tin (II) chloride, tin (IV) chloride, bis-butyltin dimethoxide, dimethyl-bis[1-oxonedecyl)oxy]stannane, and di-n-octyltin bis-isooctyl mercaptoacetate; amine catalysts, e.g., triethylenediamine, triethylamine, and tributylamine; organic acids, e.g., oleic acid and acetic acid; delayed catalysts, e.g., Polycat® catalysts, commercially available from Air Products and Chemicals, Inc.; and combinations thereof.

Additives and Fillers

Additional materials conventionally included in the polyurethane composition may be added to the prepolymer, the curing agent, or the resulting polyurethane composition. These additional materials include, but are not limited to, wetting agents, coloring agents, optical brighteners, cross-linking agents, whitening agents (e.g., $TiO_2$ and ZnO), UV absorbers, hindered amine light stabilizers, defoaming agents, processing aids, surfactants, and other conventional additives. Antioxidants, stabilizers, softening agents, plasticizers (including internal and external plasticizers), impact modifiers, foaming agents, density-adjusting fillers, reinforcing materials, and compatibilizers may also be added to the composition.

Fillers may be added to the polyurethane composition to affect rheological and mixing properties, the specific gravity (i.e., density-modifying fillers), the modulus, the tear strength, reinforcement, and the like. The fillers are generally inorganic, and typically include numerous metals, metal oxides and salts, e.g., zinc oxide, tin oxide, calcium oxide, barium sulfate, zinc sulfate, calcium carbonate, zinc carbonate, barium carbonate, clay, tungsten, tungsten carbide, silica, regrind (recycled core material typically ground to about 30 mesh particle), high-Mooney-viscosity rubber regrind, and combinations thereof.

Golf Ball Construction

Polyurethane compositions of the present invention are not limited by the use of the composition in a particular golf ball construction, and can be used to form a cover layer in a variety of golf ball constructions. For example, the compositions are suitable for use in two-piece, multi-layer, and wound golf balls, having a variety of core structures, intermediate layers, covers, and coatings.

Core Materials

Cores of the golf balls formed according to the invention may be solid, semi-solid, hollow, fluid-, powder-, or gas-filled, and may be one-piece or multi-layered. Multilayer cores include a center, innermost portion, which may be solid, semi-solid, hollow, fluid-, powder-, or gas-filled, surrounded by at least one outer core layer. The outer core layer may be solid, or it may be a wound layer formed of a tensioned elastomeric material. For purposes of the present disclosure, the term "semi-solid" refers to a paste, a gel, or the like.

Particularly suitable core materials include, but are not limited to, thermosetting materials, such as styrene butadiene, polybutadiene, isoprene, polyisoprene, and trans-isoprene; thermoplastics, such as ionomer resins, polyamides and polyesters; and thermoplastic and thermosetting polyurethane and polyureas. Particularly preferred core compositions are thermosetting rubber compositions comprising a base polymer, an initiator agent, a coagent and/or a curing agent, and optionally one or more of a metal oxide, metal fatty acid or fatty acid, antioxidant, soft and fast agent, fillers, and additives. Suitable base polymers include natural and synthetic rubbers including, but not limited to, polybutadiene, polyisoprene, ethylene propylene rubber ("EPR"), styrene-butadiene rubber, styrenic block copolymer rubbers (such as SI, SIS, SB, SBS, SIBS, and the like, where "S" is styrene, "I" is isobutylene, and "B" is butadiene), butyl rubber, halobutyl rubber, polystyrene elastomers, polyethylene elastomers, polyurethane elastomers, polyurea elastomers, metallocene-catalyzed elastomers and plastomers, copolymers of isobutylene and para-alkylstyrene, halogenated copolymers of isobutylene and para-alkylstyrene, acrylonitrile butadiene rubber, polychloroprene, alkyl acrylate rubber, chlorinated isoprene rubber, acrylonitrile chlorinated isoprene rubber, polyalkenamers, and combinations of two or more thereof. Suitable initiator agents include organic peroxides, high energy radiation sources capable of generating free radicals, C—C initiators, and combinations thereof. Suitable coagents include, but are not limited to, metal salts of unsaturated carboxylic acids; unsaturated vinyl compounds and polyfunctional monomers (e.g., trimethylolpropane trimethacrylate); phenylene bismaleimide; and combinations thereof. Suitable curing agents include, but are not limited to, sulfur; N-oxydiethylene 2-benzothiazole sulfenamide; N,N-di-ortho-tolylguanidine; bismuth dimethyldithiocarbamate; N-cyclohexyl 2-benzothiazole sulfenamide; N,N-diphenylguanidine; 4-morpholinyl-2-benzothiazole disulfide; dipentamethylenethiuram hexasulfide; thiuram disulfides; mercaptobenzothiazoles; sulfenamides; dithiocarbamates; thiuram sulfides; guanidines; thioureas; xanthates; dithiophosphates; aldehyde-amines; dibenzothiazyl disulfide; tetraethylthiuram disulfide; tetrabutylthiuram disulfide; and combinations thereof. Suitable types and amounts of base polymer, initiator agent, coagent, filler, and additives are more fully described in, for example, U.S. Pat. Nos. 6,566,483, 6,695,718, 6,939,907, 7,041,721 and 7,138,460, the entire disclosures of which are hereby incorporated herein by reference. Particularly suitable diene rubber compositions are further disclosed, for example, in U.S. Patent Application Publication No. 2007/0093318, the entire disclosure of which is hereby incorporated herein by reference.

Cover Materials

Golf balls formed according to the invention include at least one cover layer comprising a polyurethane composition of the present invention, and optionally include one or more cover layers formed from a suitable material other than a polyurethane composition of the present invention. Suitable cover materials are selected from polyurethanes, polyureas, and hybrids of polyurethane and polyurea; ionomer resins and blends thereof (e.g., Surlyn® ionomer resins and DuPont® HPF 1000 and HPF 2000, commercially available from E. I. du Pont de Nemours and Company; Iotek® ionomers, commercially available from ExxonMobil Chemical Company; Amplify® IO ionomers of ethylene acrylic acid copolymers, commercially available from The Dow Chemical Company; and Clarix® ionomer resins, commercially available from A. Schulman Inc.); polyethylene, including, for example, low density polyethylene, linear low density polyethylene, and high density polyethylene; polypropylene; rubber-toughened olefin polymers; non-ionomeric acid copolymers, e.g., ethylene(meth)acrylic acid; plastomers; flexomers; styrene/butadiene/styrene block copolymers; styrene/ethylene-butylene/styrene block copolymers; dynamically vulcanized elastomers; ethylene vinyl acetates; ethylene methyl acrylates; polyvinyl chloride resins; polyamides, amide-ester elastomers, and graft copolymers of ionomer and polyamide, including, for example, Pebax® thermoplastic polyether and polyester amides, commercially available from Arkema Inc; crosslinked trans-polyisoprene and blends thereof; polyester-based thermoplastic elastomers, such as Hytrel®, commercially available from E. I. du Pont de Nemours and Company; polyurethane-based thermoplastic elastomers, such as Elastollan®, commercially available from BASF; synthetic or natural vulcanized rubber; and combinations thereof. A particularly preferred inner cover layer material is an ionomer composition comprising a blend of Surlyn® 7940/Surlyn® 8940, optionally including a melt flow modifier.

Suitable conventional polyurethanes and polyureas are further disclosed, for example, in U.S. Pat. Nos. 5,334,673, 5,484,870, 6,506,851, 6,756,436, 6,835,794, 6,867,279, 6,960,630, and 7,105,623; U.S. Patent Application Publication No. 2009/0011868; and U.S. Patent Application No. 60/401,047, the entire disclosures of which are hereby incorporated herein by reference. Suitable polyurethane-urea cover materials include polyurethane/polyurea blends and copolymers comprising urethane and urea segments, as disclosed in U.S. Patent Application Publication No. 2007/0117923, the entire disclosure of which is hereby incorporated herein by reference.

Suitable ionomeric cover materials are further disclosed, for example, in U.S. Pat. Nos. 6,653,382, 6,756,436, 6,894,098, 6,919,393, and 6,953,820, the entire disclosures of which are hereby incorporated by reference.

Suitable cover materials and constructions also include, but are not limited to, those disclosed in U.S. Patent Application Publication No. 2005/0164810, U.S. Pat. Nos. 5,919,100, 6,117,025, 6,767,940, and 6,960,630, and PCT Publications WO00/23519 and WO00/29129, the entire disclosures of which are hereby incorporated herein by reference.

In a particular embodiment, the cover comprises an inner cover layer formed from an ionomer composition and an outer cover layer formed from a polyurethane composition of the present invention.

Coating

Golf balls are typically finished by applying one or more finishing coats over the cover. For example, a primer and a topcoat may be applied. Either or both of the primer and topcoat compositions may be pigmented or clear. Several coats of clear or pigmented coatings may be applied.

Primer compositions are typically a solvent-borne or water-borne material, particularly selected from, but not limited to, polyurethanes, polyureas, acrylic polyurethanes, polyesters, polyester acrylics, and epoxies. In a particular embodiment, the primer composition is a two-part solvent-borne polyurethane comprising a resin component and an isocyanate component. In a particular aspect of this embodiment, the isocyanate component is present in an amount of from 31 parts to 35 parts, by weight per 100 parts of the resin component. In another particular aspect of this embodiment, the resin component comprises from 50 to 58 wt % solids and the isocyanate component comprises from 46 to 53 wt % solids. In another particular aspect of this embodiment, the resin component is SPU69723D from PPG Industries and the isocyanate component is GXH69725 from PPG Industries.

Topcoat compositions are typically a solvent-borne material particularly selected from, but not limited to, polyurethanes, polyureas, acrylic polyurethanes, polyesters, polyester acrylics, and epoxies. In a particular embodiment, the topcoat composition is a two-part solvent-borne polyurethane comprising a resin component and an isocyanate component. In a particular aspect of this embodiment, the isocyanate component is present in an amount of from 68 parts to 71 parts, by weight per 100 parts of the resin component. In another particular aspect of this embodiment, the resin component comprises from 46 to 52 wt % solids and the isocyanate component comprises from 46 to 53 wt % solids. In another particular aspect of this embodiment, the resin component is SPU61369K from PPG Industries and the isocyanate component is GXH69725 from PPG Industries.

Primer and topcoat compositions optionally include additives including, but not limited to, pigments, tints, dyes, fillers, reaction enhancers or catalysts, crosslinking agents, optical brighteners, propylene carbonates, such as those disclosed in U.S. Pat. No. 5,840,788, which is incorporated in its entirety by reference herein, coloring agents, fluorescent agents, whitening agents, UV absorbers, hindered amine light stabilizers, defoaming agents, processing aids, mica, talc, nano-fillers, wetting agents, solvents, and other conventional additives.

Non-limiting examples of suitable coatings are further disclosed, for example, in U.S. Pat. Nos. 5,409,233; 5,459,220; 5,494,291; 5,820,491; 5,669,831; 5,817,735; and 7,935,421, the entire disclosure of which are hereby incorporated herein by reference In a particular embodiment, golf balls of the present invention comprise at least one coat of primer and at least one coat of topcoat. In a particular aspect of this embodiment, the primer is a solvent-borne composition and the topcoat is a solvent-borne composition.

Component Dimensions

Dimensions of golf ball components, i.e., thickness and diameter, may vary depending on the desired properties.

Golf ball cores of the present invention include single, dual, and multilayer cores, and preferably have an overall diameter within the range having a lower limit of 0.75 inches or 1 inch or 1.25 inches or 1.4 inches and an upper limit of 1.55 inches or 1.6 inches or 1.62 inches or 1.63 inches.

In a particular embodiment, the core is a solid, single layer having a diameter within a range having a lower limit of 0.750 or 1.00 or 1.10 or 1.15 or 1.20 or 1.25 or 1.30 or 1.40 or 1.50 or 1.53 or 1.55 inches and an upper limit of 1.55 or 1.60 or 1.62 or 1.63 or 1.65 inches. In a particular aspect of this embodiment, the core has a center Shore C hardness of 95 or less, or 90 or less, or 85 or less, or 80 or less, or a center Shore C hardness within a range having a lower limit of 20 or 25 or 30 or 35 or 40 or 45 or 50 or 55 or 60 or 65 or 70 or 75 and an upper limit of 60 or 65 or 70 or 75 or 80 or 83 or 85 or 90 or 95, wherein the upper limit is greater than the lower limit (e.g., when the lower limit is 65, the upper limit is 70, 75, 80, 83, 85, 90, or 95). In another particular aspect of this embodiment, the core has an outer surface Shore C hardness of 50 or greater, or 55 or greater, or 60 or greater, or 65 or greater, or 70 or greater, or an outer surface Shore C hardness within a range having a lower limit of 40 or 45 or 50 or 55 or 60 or 65 or 70 or 74 and an upper limit of 60 or 65 or 70 or 74 or 75 or 78 or 80 or 85 or 90 or 95, wherein the upper limit is greater than the lower limit (e.g., when the lower limit is 65, the upper limit is 70, 74, 75, 78, 80, 85, 90, or 95). In another particular aspect of this embodiment, the core has a low negative, low positive, or zero hardness gradient. In another particular aspect of this embodiment, the core is formed from a substantially homogeneous formulation and has a hardness gradient wherein the difference between the Shore C hardness of the outer surface and the Shore C hardness of the center of the core is within a range having a lower limit of −8 or −5 or −3 or 0 and an upper limit of 0 or 3 or 5 or 8.

In another particular aspect of this embodiment, the core has a compression of 90 or less, or 80 or less, or 75 or less, or 70 or less, or a compression within a range having a lower limit of 50 or 55 or 60 or 65 and an upper limit of 65 or 70 or 75 or 80 or 90.

In another particular embodiment, the core comprises an inner core layer and an outer core layer, the inner core layer having a diameter within a range having a lower limit of 0.900 or 0.910 or 0.920 or 0.930 or 0.940 or 0.950 or 0.960 or 0.970 or 0.980 or 0.990 or 1.000 or 1.010 or 1.020 inches and an upper limit of 1.020 or 1.030 or 1.040 or 1.050 or 1.060 or 1.070 or 1.080 or 1.090 or 1.100 or 0.110 or 1.120 or 1.130 inches, and the outer core having a thickness within the range having a lower limit of 0.050 or 0.100 or 0.200 or 0.250 inches and an upper limit of 0.280 or 0.310 or 0.440 or 0.500 inches. In a particular aspect of this embodiment, the inner core layer has a center Shore C hardness of 95 or less, or 90 or less, or 85 or less, or 80 or less, or 75 or less, or a center Shore C hardness within a range having a lower limit of 20 or 25 or 30 or 35 or 40 or 45 or 50 or 55 or 60 or 65 or 70 or 75 and an upper limit of 60 or 65 or 70 or 75 or 80 or 83 or 85 or 90 or 95, wherein the upper limit is greater than the lower limit (e.g., when the lower limit is 65, the upper limit is 70, 75, 80, 83, 85, 90, or 95). In another particular aspect of this embodiment, the inner core layer has an outer surface Shore C hardness of 50 or greater, or 55 or greater, or 60 or greater, or 65 or greater, or an outer surface Shore C hardness within a range having a lower limit of 40 or 45 or 50 or 55 or 60 or 65 or 70 or 74 and an upper limit of 60 or 65 or 70 or 74 or 75 or 78 or 80 or 85 or 90 or 95, wherein the upper limit is greater than the lower limit (e.g., when the lower limit is 65, the upper limit is 70, 74, 75, 78, 80, 85, 90, or 95). In another particular aspect of this embodiment, the inner core layer has a negative or zero hardness gradient. In another particular aspect of this embodiment, the inner core layer is formed from a substantially homogeneous formulation and the difference between the Shore C hardness of the outer surface of the inner core layer and the Shore C hardness of the center of the inner core layer is within a range having a lower limit of −20 or −15 or −10 and an upper limit of −10 or −5 or 0. In another particular aspect of this embodiment, the inner core layer has a compression of 50 or less, or 40 or less, or 30 or less, or a compression within a range having a lower limit of 10 or 15 or 20 or 25 and an upper limit of 25 or 30 or 40 or 50 or 65. In another particular aspect of this embodiment, the outer core layer has an outer surface Shore C hardness within a range having a lower limit of 70 or greater, or 75 or greater, or 80 or greater, or 85 or greater, or 89 or greater, or an outer surface Shore C hardness within a range having a lower limit of 70 or 75 or 80 or 85 or 89 and an upper limit of 80 or 85 or 90 or 93 or 95, wherein the upper limit is greater than the lower limit (e.g., when the lower limit is 85, the upper limit is 90, 93, or 95). In another particular aspect of this embodiment, the core has an overall dual core compression within a range having a lower limit of 60 or 70 or 80 or 85 and an upper limit of 85 or 90 or 95.

Golf ball covers of the present invention include single, dual, and multilayer covers, and preferably have an overall thickness within the range having a lower limit of 0.03 inches or 0.04 inches or 0.045 inches or 0.05 inches or 0.06 inches and an upper limit of 0.07 inches or 0.08 inches or 0.09 inches or 0.10 inches. Dual and multilayer covers have an inner cover layer and an outer cover layer, and multilayer covers additionally have at least one intermediate cover layer disposed between the inner cover layer and the outer cover layer. In a particular embodiment, the cover is a single layer having a thickness within a range having a lower limit of 0.020 or 0.025 or 0.030 inches and an upper limit of 0.030 or 0.040 or 0.045 or 0.050 or 0.070 or 0.100 or 0.120 or 0.150 or 0.350 or 0.400 or inches. In another particular embodiment, the cover comprises an inner cover layer and an outer cover layer, the inner cover having a thickness within a range having a lower limit of 0.020 or 0.025 or 0.030 or 0.035 inches and an upper limit of 0.035 or 0.040 or 0.045 or 0.050 or 0.100 inches, and the outer cover having a thickness within a range having a lower limit of 0.020 or 0.025 or 0.030 inches and an upper limit of 0.035 or 0.040 or 0.045 inches.

The present invention is not limited by any particular dimple pattern, dimple plan shape, dimple cross-sectional profile, or dimple size. Examples of suitable dimple patterns include, but are not limited to, phyllotaxis-based patterns; polyhedron-based patterns; and patterns based on multiple copies of one or more irregular domain(s) as disclosed in U.S. Pat. No. 8,029,388, the entire disclosure of which is hereby incorporated herein by reference; and particularly dimple patterns suitable for packing dimples on seamless golf balls. Non-limiting examples of suitable dimple patterns are further disclosed in U.S. Pat. Nos. 7,927,234, 7,887,439, 7,503,856, 7,258,632, 7,179,178, 6,969,327, 6,702,696, 6,699,143, 6,533,684, 6,338,684, 5,842,937, 5,562,552, 5,575,477, 5,957,787, 5,249,804, 5,060,953, 4,960,283, and 4,925,193, and U.S. Patent Application Publication Nos. 2006/0025245, 2011/0021292, 2011/0165968, and 2011/0183778, the entire disclosures of which are hereby incorporated herein by reference. Non-limiting examples of seamless golf balls and methods of producing such are further disclosed, for example, in U.S. Pat. Nos. 6,849,007 and 7,422,529, the entire disclosures of which are hereby incorporated herein by reference. In a particular embodiment, the dimple pattern is based on a spherically tiled tetrahedron. The dimples may have a variety of shapes and sizes including different depths and perimeters. In particular, the dimples may be concave hemispheres, or they may be triangular, square, hexagonal, catenary, polygonal or any other shape known to those skilled in the art. They may also have a cross-sectional profile based on any known dimple profile shape including, but not limited to, parabolic curves, ellipses, spherical curves, saucer-shapes, sine curves, truncated cones, flattened trapezoids, and catenary curves.

Golf balls of the present invention typically have a dimple count within a limit having a lower limit of 250 and an upper limit of 350 or 400 or 450 or 500. In a particular embodiment, the dimple count is 252 or 272 or 302 or 312 or 320 or 328 or 332 or 336 or 340 or 352 or 360 or 362 or 364 or 372 or 376 or 384 or 390 or 392 or 432.

By the present invention, it has been found that finishing golf balls with a particular coating system comprising a solventborne primer coat and a solventborne top coat as disclosed herein can improve aerodynamic properties compared to golf balls finished with a coating system comprising a waterborne primer coat and a solventborne top coat. For example, it has been found that with solventborne systems, the effective edge angle of the dimples is increased by about 0.5-0.75°, while the edge radius is decreased by about 0.005-0.010 inches, relative to waterborne systems. Thus, for the same edge angle, the solventborne system of the present invention exhibits improved stability.

In a particular embodiment, the present invention is directed to a golf ball comprising an inner core layer formed from a diene rubber composition and having a diameter of from 0.950 inches to 1.015 inches, a compression of 30 or less, a center Shore C hardness of from 65 to 75, a surface Shore C hardness of from 50 to 65, and a zero hardness gradient or a negative hardness gradient wherein the difference between the Shore C hardness of the outer surface of the inner core layer and the Shore C hardness of the center of the inner core layer is from −15 to −5, an outer core layer formed from a diene rubber composition and having a thickness of from 0.250 inches to 0.300 inches, and an outer surface Shore C hardness of from 85 to 95; an inner cover layer formed from an ionomer composition and having a thickness of from 0.030 inches to 0.040 inches, and an outer surface Shore C hardness of 93 or greater; and an outer cover layer formed from a polyurethane composition of the present invention, and having a thickness of from 0.030 inches to 0.035 inches and an outer surface Shore C hardness of from 70 to 90. In a particular aspect of this embodiment, the golf ball additionally comprises a pigmented solvent-borne primer coat and a solvent-borne topcoat.

In another particular embodiment, the present invention is directed to a golf ball comprising a solid, single-layer core formed from a diene rubber composition and having a diameter of from 1.510 inches to 1.530 inches, a compression of from 65 to 80, a center Shore C hardness of from 65 to 75, a surface Shore C hardness of from 65 to 75, and a zero hardness gradient or a negative or positive hardness gradient wherein the difference between the Shore C hardness of the outer surface of the core and the Shore C hardness of the center of the core is from −8 to 8; an inner cover layer formed from an ionomer composition and having a thickness of from 0.040 inches to 0.050 inches, and an outer surface Shore C hardness of 93 or greater; and an outer cover layer formed from a polyurethane composition of the present invention, and having a thickness of from 0.030 inches to 0.035 inches and an outer surface Shore C hardness of from 70 to 90. In a particular aspect of this embodiment, the golf ball additionally comprises a pigmented solvent-borne primer coat and a solvent-borne topcoat.

For purposes of the present invention, "compression" refers to Atti compression and is measured according to a known procedure, using an Atti compression test device, wherein a piston is used to compress a ball against a spring. The travel of the piston is fixed and the deflection of the spring is measured. The measurement of the deflection of the spring does not begin with its contact with the ball; rather, there is an offset of approximately the first 1.25 mm (0.05 inches) of the spring's deflection. Very low stiffness cores will not cause the spring to deflect by more than 1.25 mm and therefore have a zero compression measurement. The Atti compression tester is designed to measure objects having a diameter of 42.7 mm (1.68 inches); thus, smaller objects, such as golf ball cores, must be shimmed to a total height of 42.7 mm to obtain an accurate reading.

EXAMPLES

It should be understood that the examples below are for illustrative purposes only. In no manner is the present invention limited to the specific disclosures therein.

The following materials were used in the below examples:
Tinuvin® 571, 123, P, and 328 ultraviolet light absorbers, commercially available from BASF;
Tinuvin® 329 2-(2-hydroxy-5-tert-octylphenyl)benzotriazaole light absorber, commercially available from BASF;
Ethacure® 300 curative comprising dimethylthiotoluenediamine with a minor amount of monomethylthiotoluenediamine, commercially available from Albemarle Corporation;
PolyOne® 10ET103 white pigment paste, available from PolyOne Corporation;
EXWAW113S waterborne paint from Spraylat Corporation;
EXUCC052A/B solventborne topcoat from Spraylat Corporation;
SPU69723D resin and GXH69725 isocyanate, solventborne paint components from PPG Industries; and
SPU61369K resin and GXH69725 isocyanate, solventborne topcoat components from PPG Industries.

Various polyurethane cover compositions were made with a 4,4'-MDI/PTMEG prepolymer at 6.5% NCO and cured with a blend of Ethacure® 300 curative and PolyOne® 10ET103 white pigment paste. The level of $TiO_2$ in each example is 2.0 wt %, based on the total weight of the final composition. Various UV absorbers were blended into the curative as given in Table 1 below. Amounts are reported in wt %, based on the total weight of the final composition. Covers having a thickness of about 0.350 inches were formed by casting each composition about a cased core, i.e., a solid rubber core and an ionomer casing. The yellowness index (YI) of each cover was calculated according to ASTM-E 313-73 using measurements taken on an X-Rite Color-Eye® 7000A spectrophotometer, and the results are given in Table 1 below.

TABLE 1

| Example | UV absorber | wt % | YI (initial) | YI (30 min) | YI (60 min) | YI (120 min) | YI (240 min) |
|---|---|---|---|---|---|---|---|
| 1 | none | 0 | 16.39 | 57.05 | 61.62 | 65.08 | 70.37 |
| 2 | Tinuvin ® 571 | 2 | 16.44 | 43.66 | 49.60 | 55.96 | 64.05 |
| 3 | Tinuvin ® 571 | 4 | 17.48 | 37.38 | 42.66 | 49.44 | 58.30 |
| 4 | Tinuvin ® 571 | 6 | 18.60 | 32.89 | 37.51 | 43.77 | 52.67 |
| 5 | Tinuvin ® 123 | 2 | 14.99 | 45.02 | 50.96 | 57.19 | 60.38 |
| 6 | Tinuvin ® 123 | 4 | 15.57 | 39.47 | 45.37 | 51.75 | 55.60 |
| 7 | Tinuvin ® 123 | 6 | 14.80 | 34.62 | 40.34 | 46.93 | 50.82 |
| 8 | Tinuvin ® P | 2 | 17.08 | 45.03 | 50.71 | 57.28 | 60.47 |
| 9 | Tinuvin ® P | 4 | 17.18 | 39.35 | 45.30 | 51.80 | 55.44 |
| 10 | Tinuvin ® P | 6 | 18.03 | 35.72 | 40.77 | 47.51 | 51.55 |

Several polyurethane cover compositions were made with a 4,4'-MDI/PTMEG prepolymer at 6.5% NCO and cured with a blend of Ethacure® 300 curative and PolyOne® 10ET103 white pigment paste. The level of $TiO_2$ in each example is 2.0 wt %, based on the total weight of the final composition. Tinuvin® 328 UV absorber was added to either the curative, the prepolymer, or the PTMEG polyol prior to making the prepolymer, as indicated in Table 2 below. The level of Tinuvin® 328 UV absorber in each example is 5.0 wt %, based on the total weight of the final composition. Additionally, example 14 includes 0.015 wt %, based on the total weight of the final composition, of Indo Blue, commercially available from PPG Industries. Covers having a thickness of about 0.350 inches were formed by casting each composition about a cased core, i.e., a solid rubber core and an ionomer casing. The yellowness index (YI) of each cover was calculated according to ASTM-E 313-73 using measurements taken on an X-Rite Color-Eye® 7000A spectrophotometer, and the results are given in Table 2 below.

TABLE 2

| Example | UV absorber | method of incorporation | YI (initial) | YI (2.5 min) | YI (5.0 min) | YI (10.0 min) | YI (20.0 min) |
|---|---|---|---|---|---|---|---|
| 11 | none | n/a | 9.94 | 27.63 | 33.80 | 39.67 | 45.15 |
| 12 | Tinuvin ® 328 | dispersed into the curative | 12.23 | 17.86 | 20.81 | 23.92 | 27.69 |
| 13 | Tinuvin ® 328 | dissolved in the prepolymer | 16.69 | 20.57 | 23.41 | 26.46 | 28.65 |

TABLE 2-continued

| Example | UV absorber | method of incorporation | YI (initial) | YI (2.5 min) | YI (5.0 min) | YI (10.0 min) | YI (20.0 min) |
|---|---|---|---|---|---|---|---|
| 14 | Tinuvin ® 328 | dissolved into the PTMEG polyol prior to making prepolymer | 8.39 | 13.41 | 15.99 | 18.91 | 23.08 |

Covered golf balls were formed by casting either a Control formulation or Experimental formulation, as indicated in Table 3, about a cased core (i.e., a cased core, i.e., a solid rubber core and an ionomer casing) such that the cover has a thickness of about 0.350 inches. Both cover formulations (Control and Experimental) are made from a 4,4'-MDI/PTMEG prepolymer at 6.5% NCO, cured with a blend of Ethacure® 300 curative and PolyOne® 10ET103 white pigment paste, with a TiO$_2$ level of 2.0 wt %, based on the total weight of the final composition. The Control formulation does not contain Tinuvin® 328 UV absorber. The Experimental formulation comprises Tinuvin® 328 UV absorber in amount of 5.0 wt %, based on the total weight of the final composition, dissolved in the PTMEG polyol prior to making the prepolymer. Finished golf balls were then formed by applying two waterborne or solventborne paint coats, as indicated in Table 3, and then a solventborne top coat over each covered ball. The waterborne paint is EXWAW113S waterborne paint from Spraylat Corporation. The solventborne paint is made from SPU69723D resin and GXH69725 isocyanate from PPG Industries. The solventborne top coat is either formed from EXUCC052A/B solventborne topcoat components from Spraylat Corporation or SPU61369K resin and GXH69725 isocyanate solventborne topcoat components from PPG Industries, as indicated in Table 3 below.

The yellowness index (YI) of each painted ball was calculated according to ASTM-E 313-73 using measurements taken on an X-Rite Color-Eye® 7000A spectrophotometer, and the results are given in Table 3 below.

TABLE 3

| Example | Cover Formulation | Paint | Topcoat | ΔYI (initial) | ΔYI (24 hr) | ΔYI (72 hr) | ΔYI (120 hr) |
|---|---|---|---|---|---|---|---|
| 15 | Control | Waterborne | EXUCC052A/B | 0 | 10.6 | 16.5 | 18.5 |
| 16 | Control | Solventborne | SPU61369K/GXH69725 | 0 | 4.3 | 9.6 | 15.5 |
| 17 | Experimental | Solventborne | SPU61369K/GXH69725 | 0 | 4.3 | 8.5 | 10.0 |

Polyurethane cover compositions were made with a 4,4'-MDI/PTMEG prepolymer at 6.0% NCO and cured with a blend of Ethacure® 300 curative and PolyOne® 10ET103 white pigment paste. The level of TiO$_2$ in each example is 2.0 wt %, based on the total weight of the final composition. Tinuvin® 328 or Tinuvin® 329 UV absorber, as indicated in Table 4 below, was dissolved in the prepolymer. The level of Tinuvin® UV absorber in each example is 5.0 wt %, based on the total weight of the final composition. Covers having a thickness of about 0.350 inches were formed by casting each composition about a cased core to produce unfinished, i.e., covered and unpainted, golf balls. The unfinished golf balls were stored at 23° C. and 50% or 100% relative humidity, as indicated in Table 4, and observed for bloom. The results given in Table 4 below show the number of days until observable bloom.

TABLE 4

| Example | UV absorber | 50% RH | 100% RH |
|---|---|---|---|
| 18 | Tinuvin ® 328 | 7 days | 5 days |
| 19 | Tinuvin ® 329 | 49 days | 14 days |

When numerical lower limits and numerical upper limits are set forth herein, it is contemplated that any combination of these values may be used.

All patents, publications, test procedures, and other references cited herein, including priority documents, are fully incorporated by reference to the extent such disclosure is not inconsistent with this invention and for all jurisdictions in which such incorporation is permitted.

While the illustrative embodiments of the invention have been described with particularity, it will be understood that various other modifications will be apparent to and can be readily made by those of ordinary skill in the art without departing from the spirit and scope of the invention. Accordingly, it is not intended that the scope of the claims appended hereto be limited to the examples and descriptions set forth herein, but rather that the claims be construed as encompassing all of the features of patentable novelty which reside in the present invention, including all features which would be treated as equivalents thereof by those of ordinary skill in the art to which the invention pertains.

What is claimed is:

1. A golf ball comprising:
    an inner core layer formed from a diene rubber composition and having a diameter of from 0.950 inches to 1.015 inches, an Atti compression of 30 or less, a center Shore C hardness of from 65 to 75, a surface Shore C hardness of from 50 to 65, and a zero hardness gradient or a negative hardness gradient wherein the difference between the Shore C hardness of the outer surface of the inner core layer and the Shore C hardness of the center of the inner core layer is from −15 to −5;
    an outer core layer formed from a diene rubber composition and having a thickness of from 0.250 inches to 0.300 inches and an outer surface Shore C hardness of from 85 to 95;
    an inner cover layer formed from an ionomer composition and having a thickness of from 0.030 inches to 0.040 inches and an outer surface Shore C hardness of 93 or greater;

an outer cover layer formed from a polyurethane composition and having a thickness of from 0.030 inches to 0.035 inches and an outer surface Shore C hardness of from 75 to 90;

a pigmented solvent-borne primer coat; and a solvent-borne top coat;

wherein the polyurethane outer cover layer composition comprises a reaction product of a prepolymer and a curing agent, wherein the prepolymer is a reaction product of a polyol mixture and a diisocyanate, wherein the polyol mixture comprises 2-(2H-benzotriazol-2-yl)-4-(1,1,3,3-tetramethylbutyl)phenol; and wherein a core assembly consisting of the inner core layer and the outer core layer has an Atti compression of from 80 to 95.

2. The golf ball of claim 1, wherein 2-(2H-benzotriazol-2-yl)-4-(1,1,3,3-tetramethylbutyl)phenol is present in an amount of from 4 wt % to 6 wt %, based on the total weight of the polyurethane outer cover layer composition.

3. A golf ball comprising:

a solid, single-layer core formed from a diene rubber composition and having a diameter of from 1.510 inches to 1.530 inches, an Atti compression of from 65 to 80, a center Shore C hardness of from 65 to 75, a surface Shore C hardness of from 65 to 75, and a zero hardness gradient or a negative or positive hardness gradient wherein the difference between the Shore C hardness of the outer surface of the core and the Shore C hardness of the center of the core is from −8 to 8;

an inner cover layer formed from an ionomer composition and having a thickness of from 0.040 inches to 0.050 inches and an outer surface Shore C hardness of 93 or greater;

an outer cover layer formed from a polyurethane composition and having a thickness of from 0.030 inches to 0.035 inches and an outer surface Shore C hardness of from 75 to 90;

a pigmented solvent-borne primer coat; and a solvent-borne top coat;

wherein the polyurethane outer cover layer composition comprises a reaction product of a prepolymer and a curing agent, wherein the prepolymer is a reaction product of a polyol mixture and a diisocyanate, wherein the polyol mixture comprises 2-(2H-benzotriazol-2-yl)-4-(1,1,3,3-tetramethylbutyl)phenol.

4. The golf ball of claim 3, wherein 2-(2H-benzotriazol-2-yl)-4-(1,1,3,3-tetramethylbutyl)phenol is present in an amount of from 4 wt % to 6 wt %, based on the total weight of the polyurethane outer cover layer composition.

* * * * *